United States Patent [19]
Maxwell et al.

[11] Patent Number: 5,829,775
[45] Date of Patent: Nov. 3, 1998

[54] VEHICLE PROTECTOR

[76] Inventors: Boyce A. Maxwell; Shirley A. Maxwell, both of 2305 Longwood Dr., Pearland, Tex. 77581-5815; D. Diane Nicolas, 5479 Appleblossom; Sherril D. Young, 5455 Timpani, both of Friendswood, Tex. 77546

[21] Appl. No.: 631,310

[22] Filed: Apr. 10, 1996

[51] Int. Cl.$^6$ .................................................. B62D 25/12
[52] U.S. Cl. .......................... 280/507; 280/770; 280/848
[58] Field of Search .................................... 280/493, 507, 280/770, 847, 848, 850; 293/112, 114; 150/166; 296/136

[56]  References Cited

U.S. PATENT DOCUMENTS

| | | | |
|---|---|---|---|
| D. 368,677 | 4/1996 | Treadway et al. | D12/100 |
| 2,009,533 | 7/1935 | Tibbetts . | |
| 2,010,071 | 8/1935 | Fergueson et al. . | |
| 2,080,161 | 5/1937 | Berggren . | |
| 2,097,923 | 11/1937 | Hutchinson . | |
| 2,913,131 | 11/1959 | Holmes . | |
| 3,860,266 | 1/1975 | Frank et al. . | |
| 4,921,276 | 5/1990 | Morin . | |
| 4,966,378 | 10/1990 | Cook . | |
| 5,171,056 | 12/1992 | Faludy et al. | 296/163 |
| 5,482,310 | 1/1996 | Staggs | 280/477 |
| 5,488,981 | 2/1996 | Burkhart . | |
| 5,513,894 | 5/1996 | Ragsdale | 296/180.2 |
| 5,560,384 | 10/1996 | Oh | 135/115 |
| 5,560,412 | 10/1996 | Murray | 160/67 |
| 5,560,525 | 10/1996 | Grohmann et al. | 224/310 |
| 5,560,628 | 10/1996 | Horn | 280/402 |
| 5,560,631 | 10/1996 | Salvo | 280/507 |
| 5,622,214 | 4/1997 | Baka et al. | 160/71 |

OTHER PUBLICATIONS

Tow Car Shield, Eagle Products, p. 78, 1995.
Sunguard Custom Windshield Covers, (includes Coachmask, Tire Savers, Window Shades, Wiper Savers, Custom Windshield Cover), 1995.
Excerpts from Camping World 1995: E. 1223 Rock Solid Protective Guard; p. 14, Northern's Heavy Duty, Tougher Tarps, Vinyl RV Air Conditioner Cover–Adco Products, 12277 Auto Lock Tie Down straps; p. 33, Cover Keeps Your RV Looking Good; H, C. Vinyl Windshield cover, B. Gold Coast Solar Outside Windshield Cover, Covers—Adco Products Incorporated, 1200, 1226 Splash Stop Brush; C, D. Adco Folding Trailer Cover Combos, B. Snooze Bonnet, 16" Dirt Skirt for your RV, D. Adco's Waterproof Nylon Bike Cover, C. Cover It Instant Garage, 441–R419 ATV Cover, 6502–R419 PVC silver Scooter Cover, 11008–R419 Stretchable Cargo Net, Truck Bed Cover Looks Great! (items 334272–R419 et seq.).

Primary Examiner—Harry C. Kim
Assistant Examiner—John L. Beres
Attorney, Agent, or Firm—Guy McClung

[57] ABSTRACT

A protector has been invented for positioning in a space between two vehicles, one positioned behind the other the protector including a protective member configured to fit into the space between the two vehicles, and movement apparatus connected to the protective member for accommodating relative movement between the two vehicles. In one aspect the protector is formed of flexible material such as screening, mesh, metal foil, cloth, canvas, fencing, fiberglass, nylon and plastic. In another aspect the protector has a sub-member formed of or secured to the protective member and positioned to protect the protective member from effects of a vehicle exhaust adjacent the protective member when the protector is emplaced between two vehicles. In another aspect the protector has a protective member with a periphery and four sides and four corners, a cable movably disposed through a channel formed around the periphery of the protective member, the cable having exposed portions at two corners or at each of the four corners of the protective member, and one or more first pulleys spaced apart and connected to a first vehicle, the pulley(s) spaced apart and connected to a second vehicle interconnected to the first vehicle, and the cable movable on all the pulleys. A spring or springs may be used with the pulleys, in place of the pulleys, or in place of two of the pulleys at either end of the protective member.

13 Claims, 9 Drawing Sheets

VEHICLE PROTECTOR

BACKGROUND OF THE INVENTION

1. Field of the Invention

This invention is directed to a protective member disposed between two vehicles to protect them from items, gravel, or debris in a street or roadway that are thrown up between the vehicles; and, in one particular aspect, to such a protector which is movably disposed between a prime mover and a trailer or an automobile towed behind the prime mover.

2. Description of Related Art

Applicants are aware of protective grills and coverings for the front end of an automobile or truck and of a solid plastic guard mountable on a tow bar between two vehicles. Applicants are also aware of mud flaps, mud guards for vehicles and of a multi-bristle guard which is placed along the entire width at the rear of a prime mover to prevent gravel and debris from being thrown up by the prime mover against the front of a vehicle behind or being towed behind a prime mover.

Nothing presently known to applicants effectively prevents junk, gravel, debris and other items from being thrown up in the space between two vehicles and damaging one vehicle or the other. One particular problem that has existed for a long time and which has not been solved is the problem of gravel kicked up by the rear tires of a truck or prime mover against the whole front end of a vehicle or automobile being towed by the truck or prime mover. Such gravel can also strike the rear end of the truck or prime mover or a towed automobile's hood or windshield. Similar problems have long existed when towing a trailer.

SUMMARY OF THE PRESENT INVENTION

The present invention, in certain embodiments, discloses a protector for positioning between two vehicles, including, but not limited to, between a front prime mover (such as an automobile, motorhome, or truck) and a rear vehicle, including but not limited to an automobile, truck, or trailer, towed by the front prime mover. In one aspect the protector includes a protective member made from any suitable material, fabric, canvas, foil, mesh, screening cloth, nylon, or plastic, or combination of these materials, or a plurality of such members that are interconnected.

To accommodate the varying positions that one vehicle may assume with respect to the other, e.g. during turning, in one aspect the protective member is fixed only to a first vehicle and another second vehicle is free from, and therefore free to move with respect to, the first vehicle. In another aspect, at least one end of the protective member is connected to a vehicle by a yielding member or members, e.g. one or more springs or elastic connectors or bands. In another aspect the protector itself has pieces or members which expand and contract to accommodate movement; e.g. excess cloth, pleated screening, interior springs between multiple flat pieces, or fabric which has sufficient elongation and spring-back. In another aspect a protective member has one or more ropes or cables running on one or more pulleys connected to at least one of the vehicles; and, in one particular embodiment two pulleys are used spaced apart from each other on one vehicle. In another aspect any combination of the above-described structures is used.

In certain embodiments the protective member is one integral piece of material. In other aspects the protective member is one primary piece of material with one or more secondary areas made from a different material; e.g. a large primary member made of tough plastic with a smaller secondary member made of either Kevlar™ material or metal sheet for positioning adjacent a prime mover's exhaust. Metal mesh, screening, flexible foil, perforated plate, or fencing of a sufficiently tight mesh pattern may be used for all or part of the protective member as may any known plastic, canvas, fiberglass material or fireproof cloth.

With either a solid or non-solid protective member, holes may be cut to accommodate any mechanical device or protruding member present between the two vehicles; e.g., but not limited to, part of an integral jack or tow bar projecting upwardly. Also, one or more slits or slots may be used to prevent moisture ponding and to promote drainage. Suitable mesh material, e.g. screen or fencing, may be secured over any such slot or slit. Also a movable flap secured at one side may be used to cover any slit or slot. The protective member, rather than being substantially flat may have one or more raised portions to accommodate other devices.

In certain preferred embodiments a protective member according to this invention includes a second vehicle protector which is secured to or formed integrally of the protector between the two vehicles. The second vehicle protector is sized, configured, and positioned to cover part or all of the second vehicle's front portion and can extend over the windshield. Also, or alternatively, an end protector for the first vehicle may be secured to or formed integrally of the protective member for the space between the vehicles and this end protector may cover some (e.g. only a lower portion, e.g. one to four feet) or all of the rear end of the first vehicle. In one aspect both the second vehicle protector and end protector for the first vehicle are used.

The present invention, in certain embodiments, discloses a protector for positioning in a space between two vehicles, the two vehicles including a first vehicle in front of a second vehicle, the protector having a protective member configured to fit into the space between the two vehicles, and movement apparatus connected to the protective member for accommodating relative movement between the two vehicles; such a protector wherein the protective member is formed of material selected from the group consisting of screening, nylon, mesh, metal foil, cloth, fencing, fiberglass, and plastic; such a protector wherein the material is flexible; such a protector wherein the protective member has a plurality of pieces of the material, the pieces interconnected together; such a protector wherein the pieces are interconnected by elastic members or springs; such a protector wherein the protective member has at least one hole therethrough to accommodate another item like a part of a jack or tow bar and to inhibit sailing of the protective member; such a protector wherein the protective member has at least one hole therethrough through which another member may protrude when the protector is emplaced between the two vehicles; such a protector with a sub-member formed of or secured to the protective member and positioned to protect the protective member from effects of a vehicle exhaust adjacent the protective member when the protector is emplaced between two vehicles; such a protector wherein the movement apparatus includes the protective member having a periphery and four sides and four corners, a cable movably disposed through a channel formed around at least a portion of a periphery of the protective member, the cable having exposed portions at at least two corners of the protective member, and at least one pulley connected to one of the vehicles, the cable movable on the pulley; such a protector wherein the movement apparatus includes the protective member having a periphery and four sides and four corners, at least one spring connected to one of the four corners of the protective member, and at least one spring connected to one of the vehicles; such a protector wherein the movement apparatus includes the protective member having a periphery and four sides and four corners, a cable movably disposed through a channel formed around the periphery of the protective member, the cable having exposed portions at each of the four corners of the protective member, two pulleys spaced apart and connected to a first vehicle, the cable movable on the pulleys, and two springs spaced apart and movably connected to the cable and connected to a second vehicle interconnected to the first vehicle, the cable movable with respect to the springs; such a protector wherein the at least one spring includes a first spring and a second spring, the first spring connected to a first end of the protective member and to a first vehicle of the two adjacent vehicles and the second spring connected to a second end of the protective member spaced apart from and opposite the first end of the protective member, and the second spring connected to an end of the second vehicle spaced apart from the end of the first vehicle; such a protector with a stiffener member secured to the first end of the protective member and the first spring connected to the stiffener member. In one aspect a protector is disclosed for positioning in a space between two adjacent vehicles, one vehicle in front of and connected to the other, the protector having a protective member configured to fit into the space between the two vehicles, movement means connected to the protective member for accommodating relative movement between the two vehicles, the protective member having at least one hole therethrough to inhibit sailing of the protective member, the protective member having a periphery and four sides and four corners, a cable movably disposed through a channel formed around at least a portion of the periphery of the protective member, the cable having exposed portions at at least one of the four corners of the protective member, a pulley connected to a first vehicle, the cable movable on the pulley, and a spring and movably connected to the cable and connected to a second vehicle interconnected to the first vehicle, the cable movable with respect to the spring. In another aspect a protector is disclosed for positioning in a space between two vehicles including a first vehicle towing a second vehicle, the protector having a central protective portion configured to fit into the space between the two vehicles, a first vehicle protective portion connected at one end to the central protective portion and at another end connectible to the first vehicle, a second vehicle protective portion connected at one end to the central protective portion and at another end connectible to the second vehicle, and movement apparatus associated with the protector for accommodating relative movement between the two vehicles.

It is, therefore, an object of at least certain preferred embodiments of the present invention to provide:

New, useful, unique, efficient, nonobvious protector for positioning between two vehicles; in one aspect to protect a towed vehicle and in another aspect to protect a towing vehicle and a towed vehicle;

Such a protector which accommodates relative movement between two vehicles;

Such a protector which is attached with either one or more pulleys and/or one or more springs to the first vehicle, the second vehicle, or both;

Such a protector made of one or more flexible and/or elastic portions or pieces;

Such a protector made of cloth, canvas, screen, fencing, foil, metal sheet, fabric, nylon, fiberglass or a combination of such materials or with different portions or pieces made of different materials;

Such a protector including a first vehicle protective member covering and/or protecting part of a first vehicle and a second vehicle protective member for covering and/or protecting part of a second vehicle positioned behind the first vehicle;

Such a protector with one or more holes, slits and/or slots to promote moisture drainage and inhibit sailing of the protector, to provide access through it, and/or to accommodate devices, items, or members protruding from a vehicle, a tow apparatus, or a jack or other apparatus;

Such a protector with a movable flap over any such hole, slit, or slot;

Such a protector with a second vehicle protective member with a cut-out portion to permit air to flow to a radiator of the second vehicle; such a protector with screening or mesh over the cut-out portion; and Such a protector formed of a plurality of interconnected pieces; such a protector in which the pieces are made of different material; such a protector in which the pieces are easily removed and replaced; such a protector which is custom assembled to fit any desired size, space or configured space; and such a protector including elastic or spring members between two or more of the pieces.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 16A–16F show a protector according to the present invention.

DESCRIPTION OF EMBODIMENTS PREFERRED AT THE TIME OF FILING FOR THIS PATENT

FIGS. 1A–1F show a protector 10 according to the present invention which includes a substantially flat flexible body member 12 (made e.g., but not limited to flexible plastic sheeting, nylon, or canvas) with cut-out corners—corners 14, 16 at an end 15 and corners 18, 19 at an end 17. Elastic members 20 sewn on from one end of the body member 12 to the other enhance strength and flexibility and allow for expansion and contraction to cover different size inter-vehicle spaces and to accommodate movement of one vehicle with respect to the other.

A channel 22 is formed around three sides of the periphery of the body member 12 by an overlapped portion of the body member sewn to itself. Wires, ropes, or cables 13, 15, 19 pass through the channels 22, with portions exposed at each of the corners 14, 16, 18, 19. The cable 30 moves over two pulleys 32 and 34 at one end of the body member 12 which are connected with eyebolts 31 and 33 to a first vehicle (not shown). The other end of the body member 12 is connected to another vehicle (not shown) by springs 36 and 38 connected to the cable 30. In certain embodiments only one spring is used. This system of pulleys and springs accommodates relative movement of the two vehicles, preventing damage to the protector 10 and to the vehicles, e.g. during turning.

A cut out slot 39 provides a passageway through the body member 12 for a protruding part of a device, e.g. a tow bar or jack, situated between the two vehicles. Such a slot also inhibits sailing of the body member 12. A flap 35 movably connected to the body member 12 (e.g. with velcro™ material or sewn along one end of side) selectively covers the slot. A connector 41 is disposed between the pulley 32 and the eyebolt 31; and a connector 42 is disposed between the pulley 34 and the eyebolt 33. A spring may replace or be used with the connectors 41 and 42.

Figure 1A:
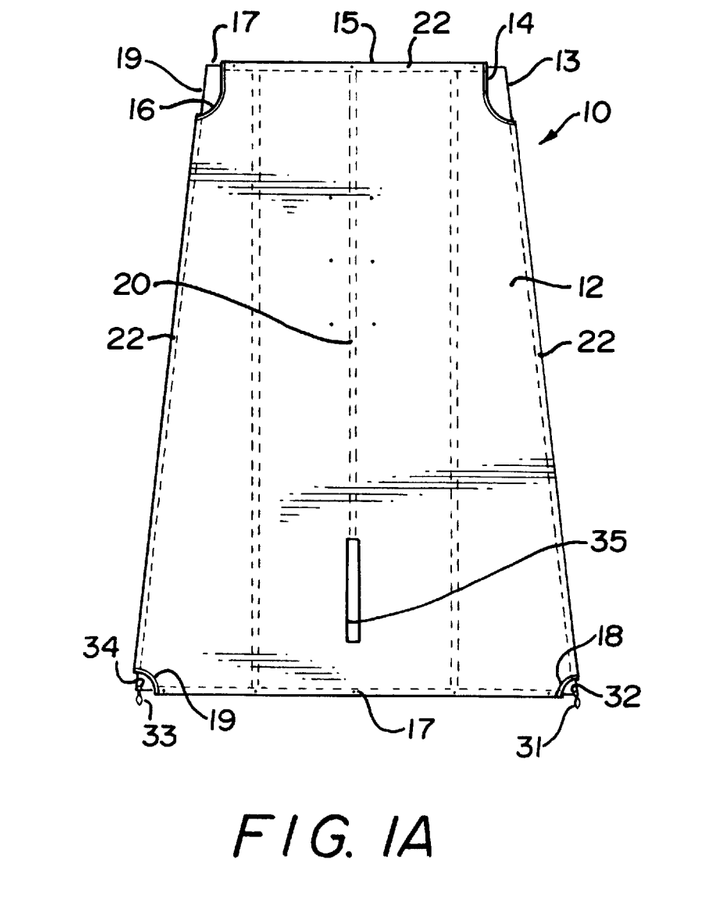
FIG 1A is a top view of a vehicle protector according to the present invention.
Figure 1B:
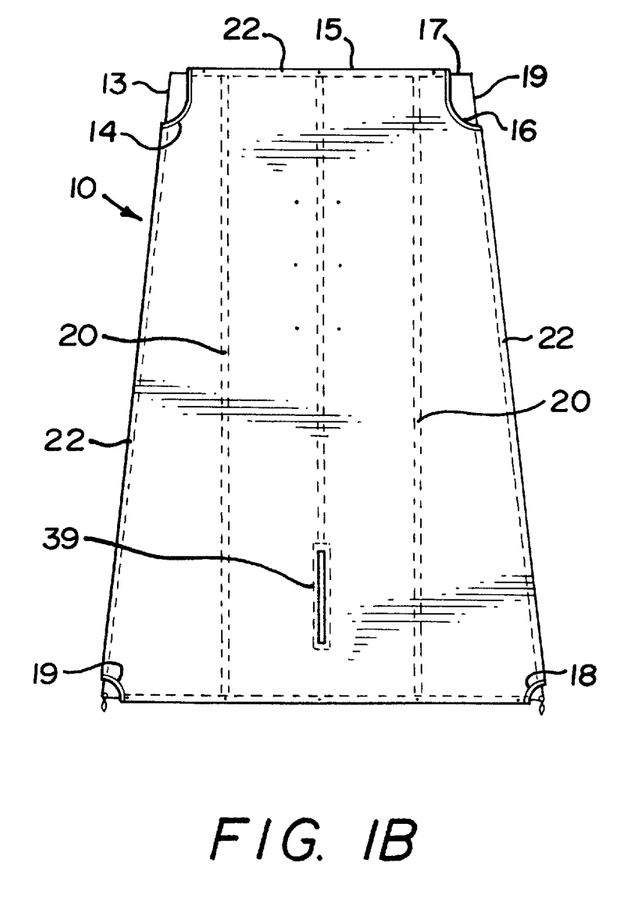
FIG. 1B is a bottom view of the protector of FIG. 1A.
Figure 1C:
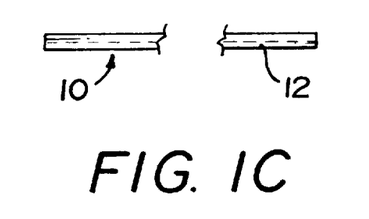
FIG. 1C is a front view of the protector of FIG. 1A.
Figure 1D:
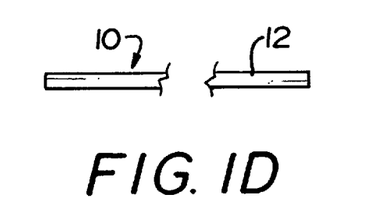
FIG. 1D is a rear view of the protector of FIG. 1A.
Figure 1E:
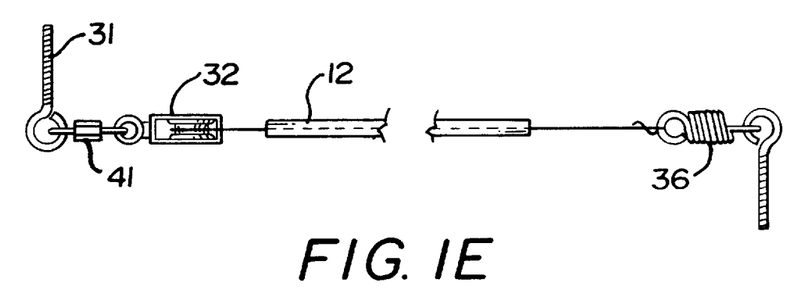
FIG. 1E is a view of a first side of the protector of FIG. 1A.
Figure 1F:
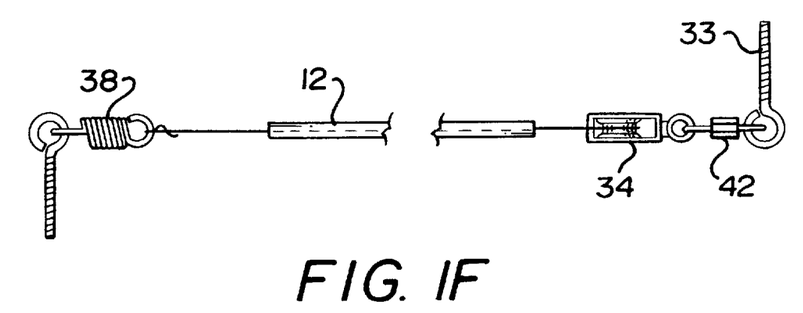
FIG. 1F is a view of a second side of the protector of FIG. 1A opposite the first side.
Figure 2A:
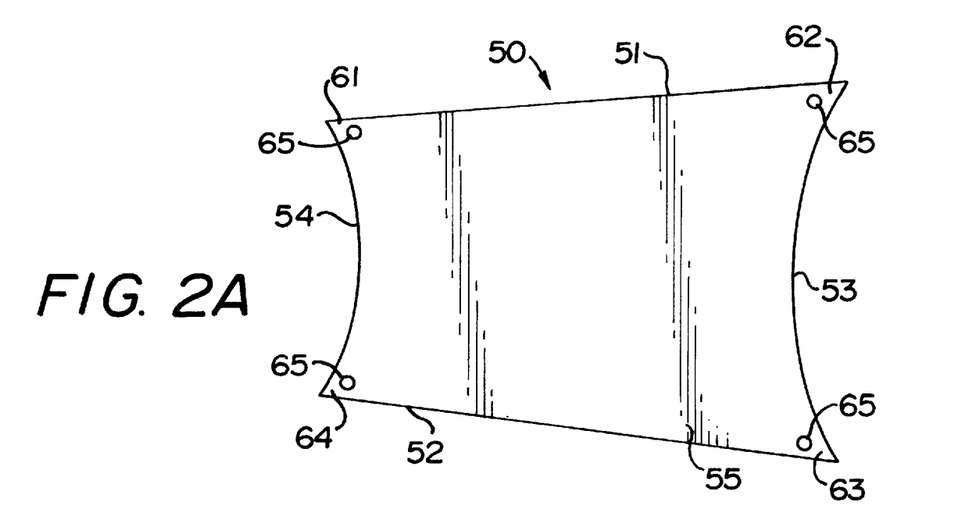
FIG. 2A is a top view of a protector according to the present invention.
Figure 2B:
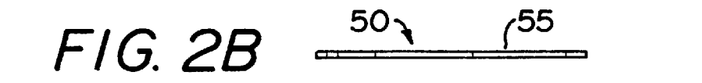
FIG. 2B is an end view of the protector of FIG. 2A.
Figure 2C:
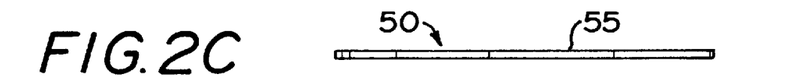
FIG. 2C is an end view of the protector of FIG. 2A.
Figure 2D:
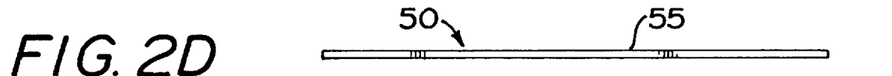
FIG. 2D is a side view of the protector of FIG. 2A.
Figure 2E:
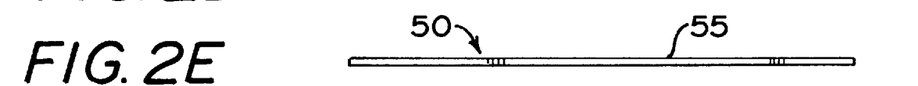
FIG. 2E is a side view of the protector of FIG. 2A.
Figure 2F:
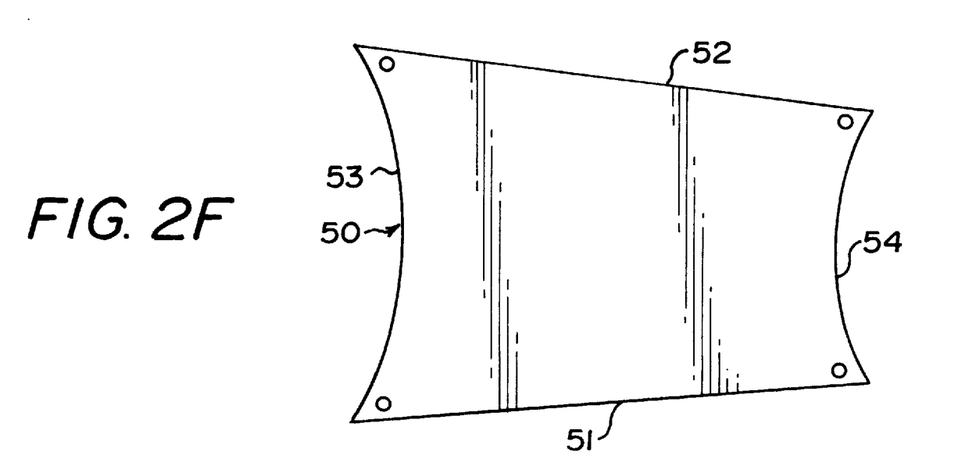
FIG. 2F is a bottom view of the protector of FIG. 2A.
Figure 3:
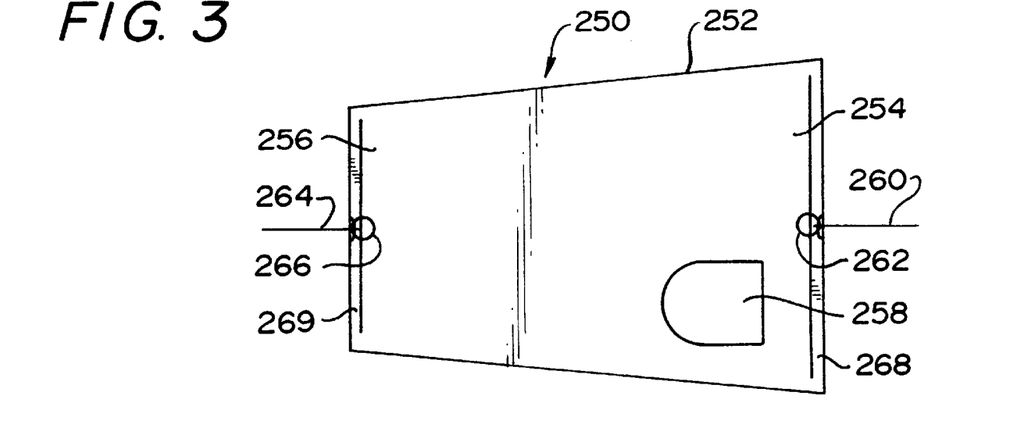
FIG. 3 is a top view of a protector according to the present invention.

FIGS. 2A–2G show a protector 50 according to the present invention which has a body member 55 with four sides 51, 52, 53, and 54 and four corners 61, 62, 63, 64 each with a hole 65 therethrough. The body member 55 may be rigid and connected to vehicles with suitable cable or rope and spring combinations with the cable or rope passing through the holes 65; or a single unitary cable passing through the holes 65 and alternating on sides of the body member 55 may be used with pulleys or springs or both (e.g. as with the protector 10). The body member 55 may also be made of any suitable flexible material FIG. 3 shows a protector 250 according to the present invention with a body 252, an end 254, an end 256, and a fireproof portion 258. A rope 260 is tied through a hole 262 with its free end for attachment to a first vehicle. A rope 264 is tied through a hole 266 with its free end for attachment to a second vehicle. Stiffener strips 268 and 269 are secured to each end of the body 252 (or rods may be used as in FIG. 7).

Figure 4:
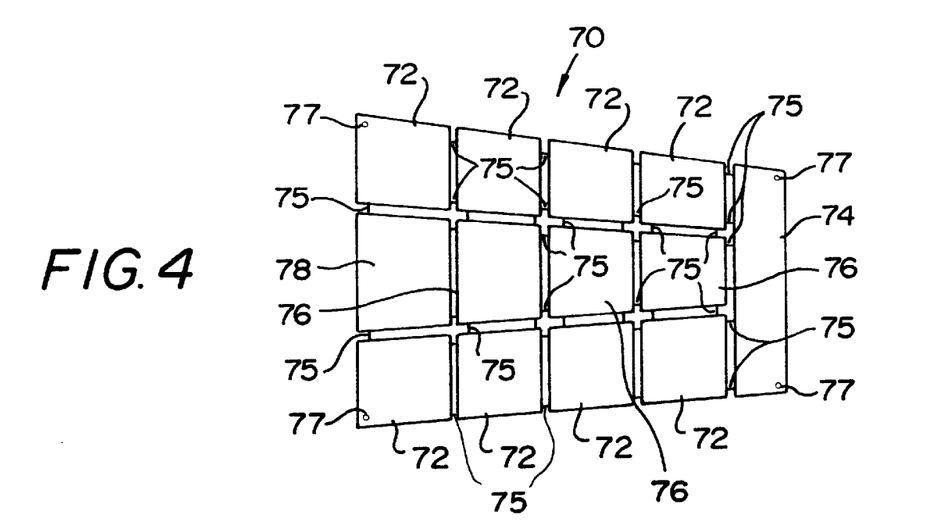
FIG. 4 is a top view of a protector according to the present invention.

FIG. 4 shows a protector 70 according to the present invention which has a plurality of interconnected members 72, 74, 76, and 78 which are preferably, interconnected by elastic bands or springs 75. Holes 77 provide for connection of ends of the protector 70 to two adjacent vehicles. Any of the interconnected members may be made of flexible material or of solid material.

Figure 5:
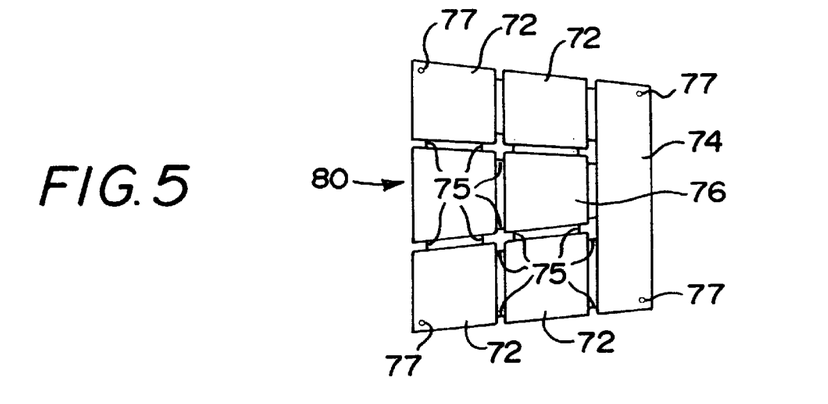
FIG. 5 is a top view of a protector according to the present invention.

FIG. 5 shows a protector 80 like the protector 70, but with fewer interconnected members (like numerals denote like parts).

Figure 6:
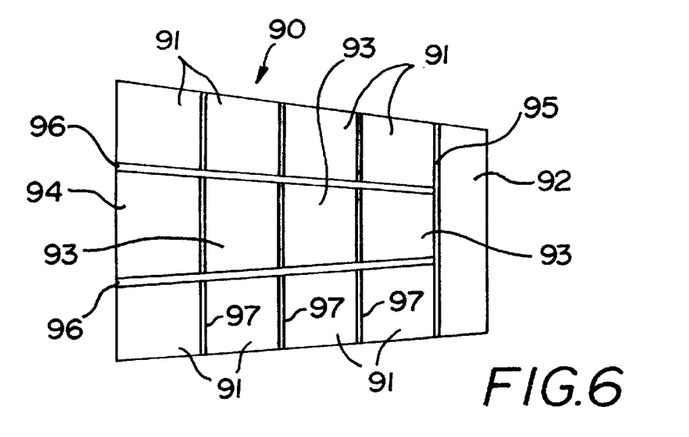
FIG. 6 is a top view of a protector according to the present invention.

FIG. 6 shows a protector 90 according to the present invention which has interconnected members 91, 92, 93, and 94. Unlike the protectors 70 and 80, there are no open spaces between the interconnected members. Strips 95, 96, and 97 are sealingly secured between the various interconnected members. In one aspect the strips are rigid as are the interconnected members. In one aspect the strips are made of flexible material and the interconnected members are rigid, thus the strips provide flexibility between members. In one aspect both the strips and the interconnected members are flexible. As with the protectors 70 and 80, any of the interconnected members in the protector 90 may be made of metal, fiberglass or some other fireproof material and may be positioned to encounter the hot exhaust from one of two adjacent interconnected vehicles between which the protector is positioned.

Figure 7:
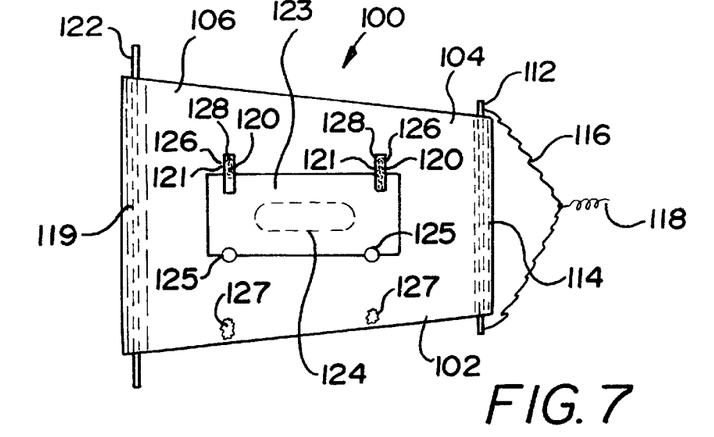
FIG. 7 is a top view of a protector according to the present invention.

FIG. 7 shows a protector 100 according to the present invention with a body member 102 with a first end 104 and a second end 106. A rigid rod 112 is secured to the end 104, e.g. by passing through a channel 114 formed by or through the end 104. A rope or cable 116 is connected to the ends of the rod 112 and a spring 118 is connected to the cable 116. The spring 118 is connected to a vehicle (not shown). A rod 122 at the end 106 passing through a channel 119 is connected to another vehicle (not shown) by rope or cable and/or with pulleys and/or springs (as for the protector 10) or with a cable and spring like the cable 116 and the spring 118. A hole 124 through the body member 102 is selectively closed off by a flap 123 which is movably secured to the body member 102 by connectors 125 and releasable straps 126. Velcro™ material 121, 127, 128, and 129 is used with the straps 126 (material 127 on the body member 102; material 128 on top of the straps 126; material 121 on the bottom of the straps 126; and material 120 on the body member 102 beneath the straps 126).

Figure 8:
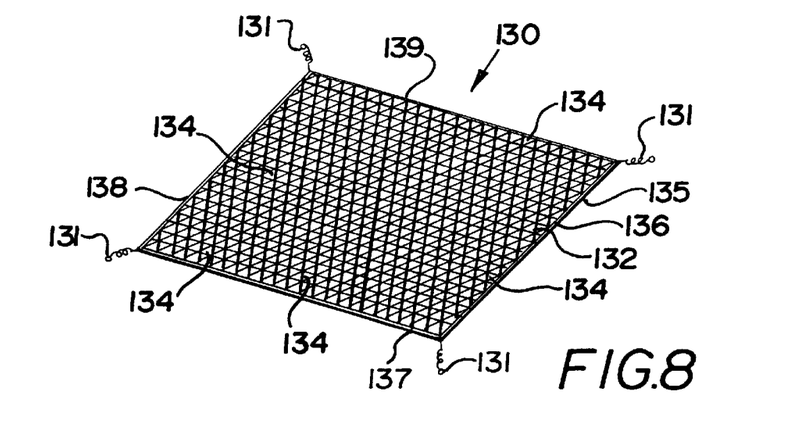
FIG. 8 is a top view of a protector according to the present invention.

FIG. 8 shows a protector 130 according to the present invention with a body member 132 made of metal grid material with a multiplicity of openings 134 therethrough. A frame 135 with interconnected sides 136, 137, 138, 139 encompasses the body member 132 which is secured to the frame 135. Springs 131 are used to connect the protector 130 to vehicles. The openings 134 may be of any desired size and shape.

Figure 9:
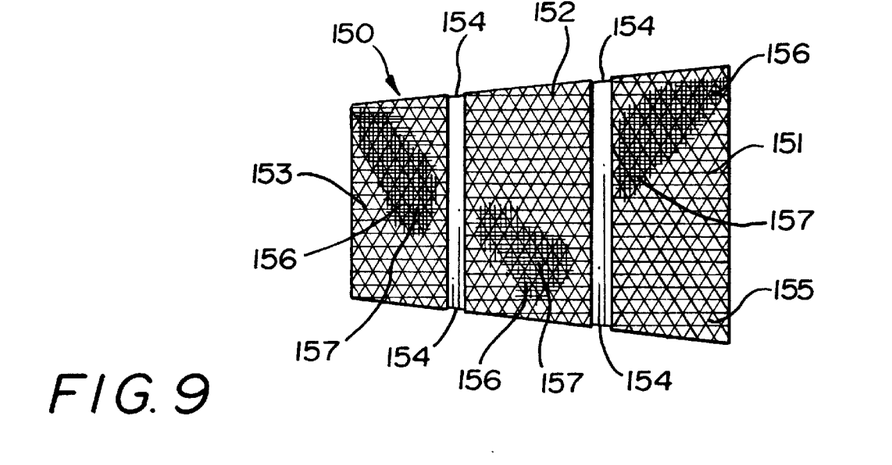
FIG. 9 is a top view of a protector according to the present invention.

FIG. 9 illustrates a protector 150 according to the present invention which has three interconnected body members 151, 152, and 153 interconnected with cable, wire, rods or ropes 154 so there is open space between the body members. As shown each body member is made with a lower metal grid 155 and an upper screen 156. Some or all the screens may be fused, bonded, or welded to the metal grid, or only the periphery of the screens may be bonded around the edge of the metal grid. The screen may be of any desired mesh size opening and openings 157 in the metal grid may be of any desired size.

Figure 10:
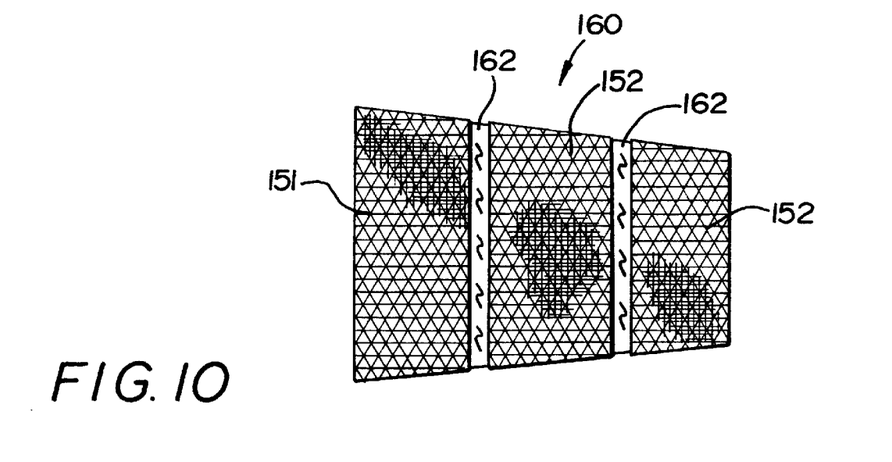
FIG. 10 is a top view of a protector according to the present invention.

FIG. 10 shows a protector 160 like the protector 150 (like numerals indicate like parts) but with intermediate members 162 connected between the body members. In one aspect the intermediate members 162 are flexible to permit flexibility between the body members. In another aspect the intermediate members are rigid. The protectors 150 and 160 may have suitable holes or channels for connection apparatus as described above for other protectors according to this invention.

Figure 11:
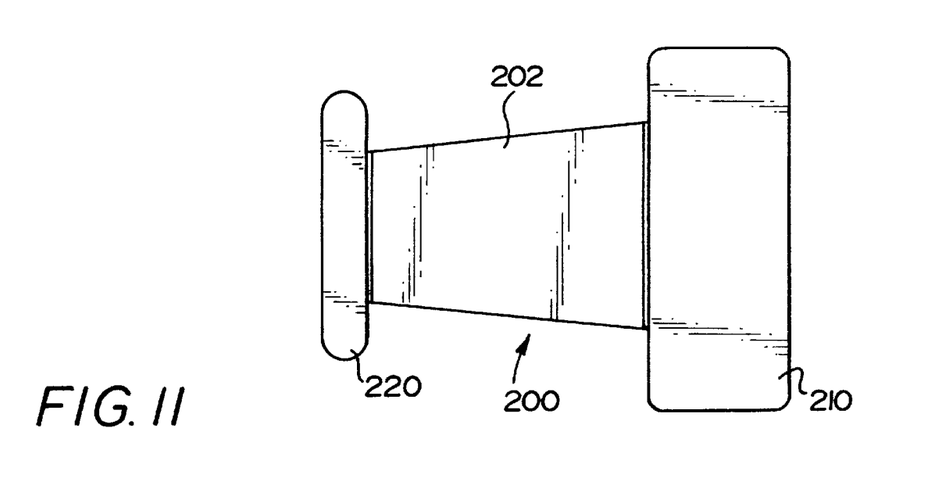
FIG. 11 is a top view of a protector according to the present invention.

FIG. 11 shows a protector 200 according to this invention which may be like any protector previously described herein. The protector 200 has a central protective member 202. A first vehicle protector 210 may be any desired size shape and configuration for protecting part of a first vehicle. The first vehicle protector 210 is formed integrally of or secured to the central protective member 202. For example (and without limitation), the first vehicle protector 210 may be a rectangular sheet of canvas or thick plastic securable over the back end of a prime mover such as a truck or automobile. A second vehicle protector 220 is secured to or formed integrally of an end of the central protective member 202 opposite the end with the first vehicle protector 210. The second vehicle protector 220 may be sized, shaped and configured to cover only the very front portion of a second vehicle (e.g. a vehicle towed by the prime mover) or it may be large enough to cover the hood or hood and windshield of a towed vehicle—or even substantially all of the towed vehicle.

Figure 12:
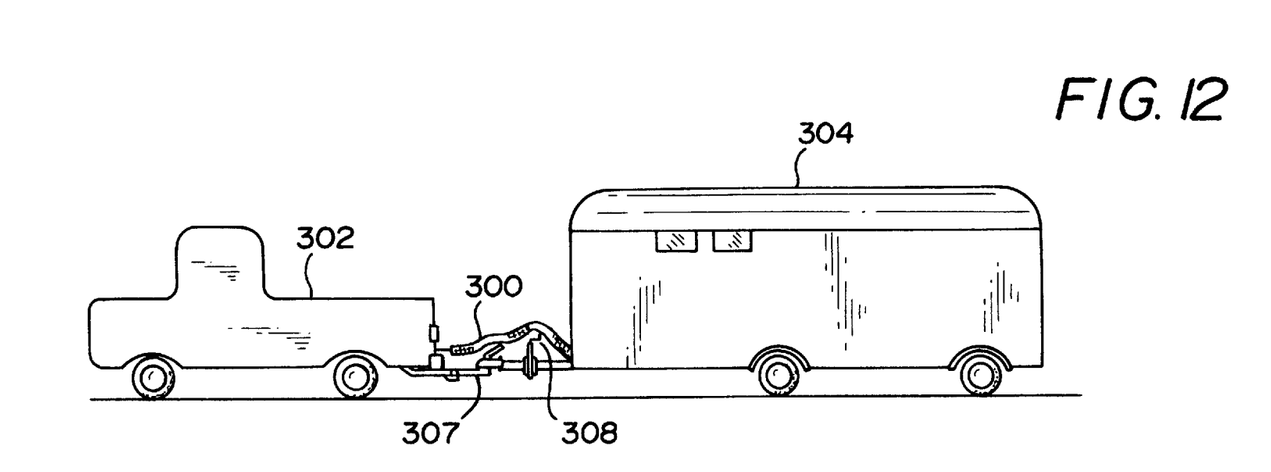
FIG. 12 is a side view showing a protector according to the present invention between two vehicles.

FIG. 12 shows a protector 300 according to the present invention, like any protector described herein, positioned and interconnected between a prime mover vehicle, a truck 302 and a second towed vehicle, a trailer 304. The protector 300 may drape over the trailer hitch 307 and the jack 308, as shown, or pockets may be formed in the protector 300 to receive and cover these items. Alternatively holes may be used in the protector through which the items project.

Figure 13:
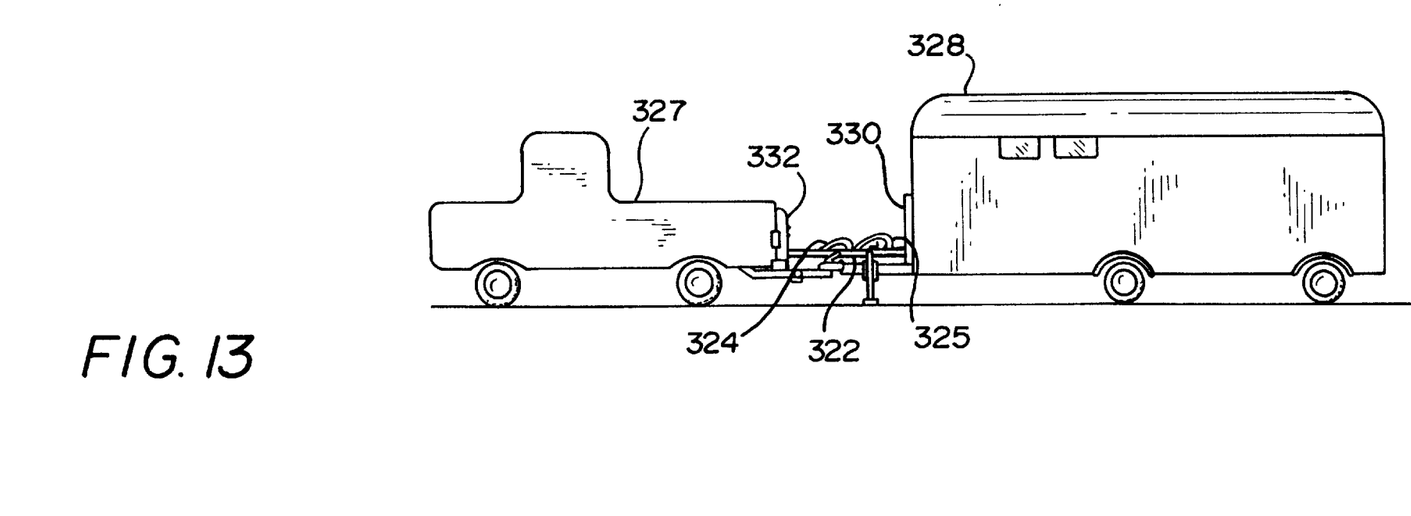
FIG. 13 is like FIG. 12.

FIG. 13 shows a protector 320 according to the present invention, like the protector 200, positioned and interconnected between a truck 327 and a towed trailer 328. The protector 320 has a central protective member 322 (like the central protective member 202, FIG. 11); a towed vehicle protector 330 (like the first vehicle protector 210, FIG. 11); and a second vehicle protector 332 (like the second vehicle protector 220, FIG. 11). The protector 320 may be formed of flexible material to accommodate relative movement of the vehicles; or only the central protective member 322 may be formed of flexible material. Also the various parts (322, 330, 332) may be interconnected by springs or by flexible strips. The central protective member 322 has a pocket 324 for the hitch 307 and a pocket 325 for the jack 308.

Figure 14:
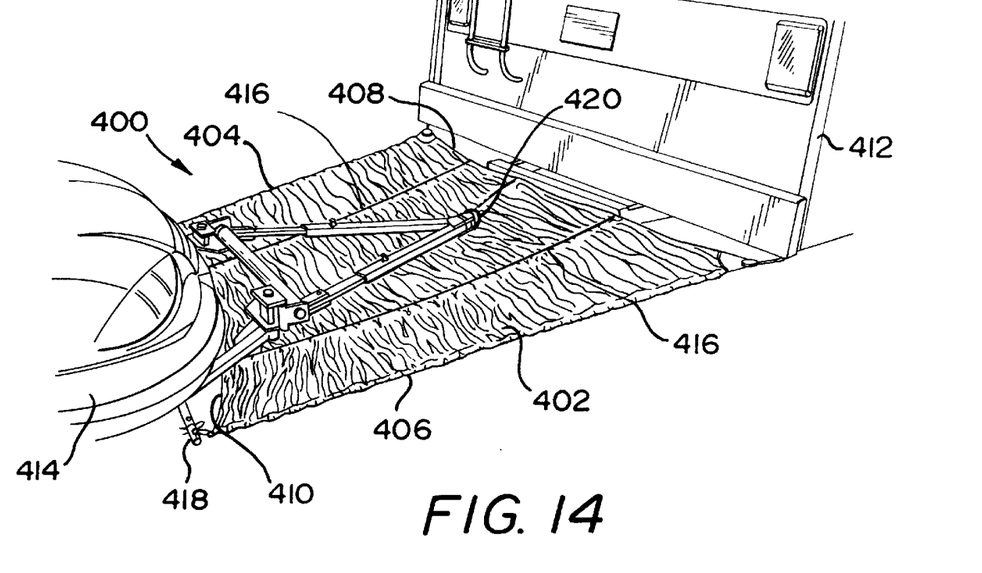
FIG. 14 is a perspective view of a vehicle protector according to the present invention.

FIG. 14 shows a protector 400 according to the present invention with a body 402, sides 404, 406, and ends 408, 410. The end 408 is connected to a prime mover, a motorhome 412; and the end 410 is connected to an automobile 414 towed behind the motorhome 412 with a typical towbar 414. The body 402 is made of flexible material, e.g. but not limited to ripstock nylon material, with two lines of elastic material 416 sewed from one end 408 to the other end 410. The material is also bunched up between the ends and between the sides. The end 410 is secured to a bar 418 which is secured to the automobile 414 at such a point underneath the body of the automobile that the front lights are protected by the protector 400. A part of a hitch connected to the rear of the motorhome 412 projects through a hole 420 in the body 402 so the towbar can be positioned above the body 402.

Figure 15A:
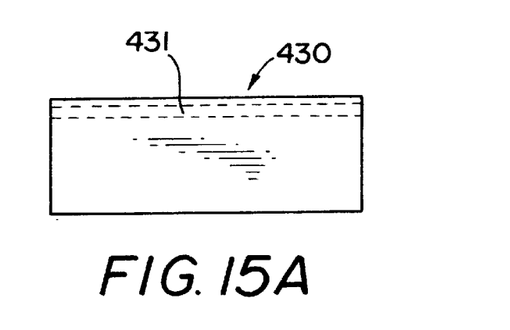
FIGS. 15A–15D are top views that illustrate a variety of ways to connect a protector end to a vehicle.
Figure 15B:
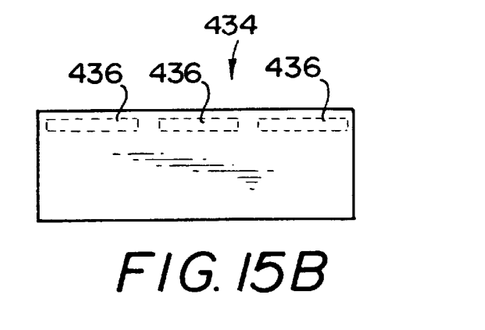
Figure 15C:
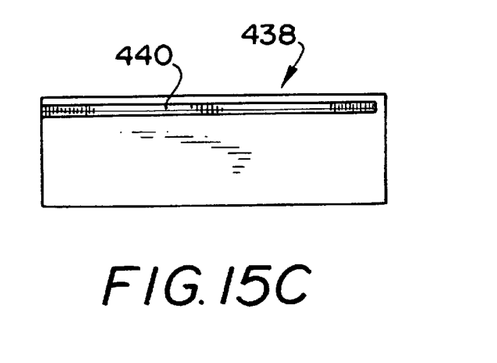
Figure 15D:
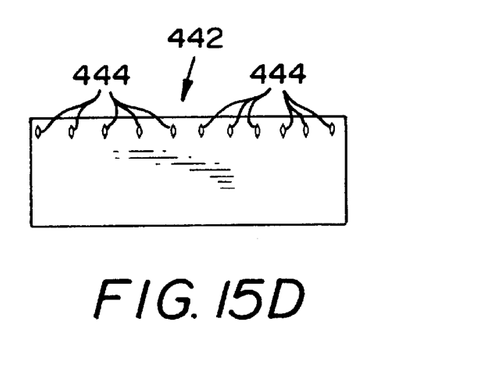
Figure 16A:
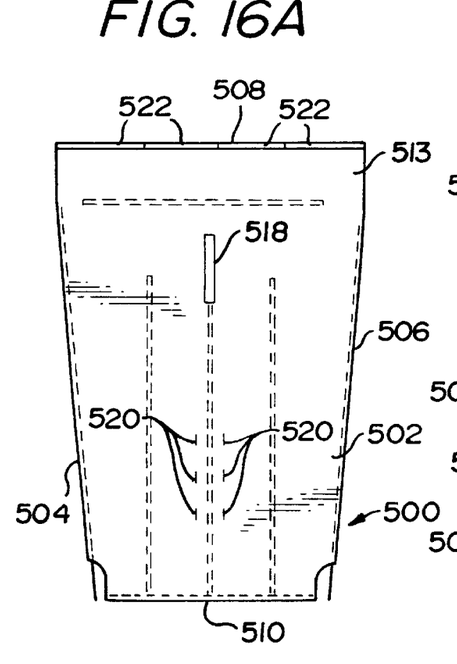
FIG. 16A is a top view.
Figure 16B:
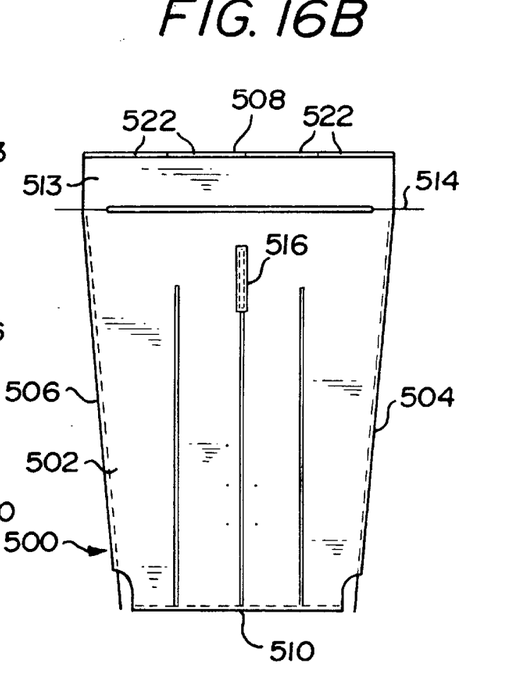
FIG. 16B a bottom view.
Figure 16C:
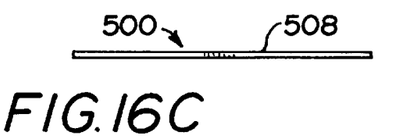
FIG. 16C an end view.
Figure 16D:
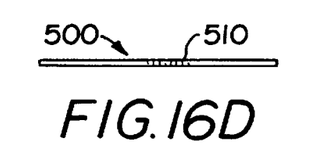
FIG. 16D an end view.
Figure 16E:
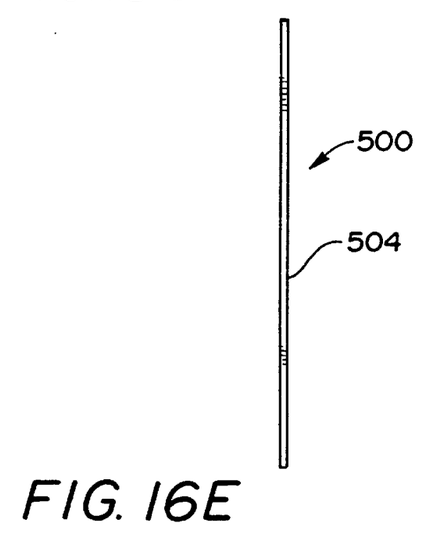
FIG. 16E a side view.
Figure 16F:
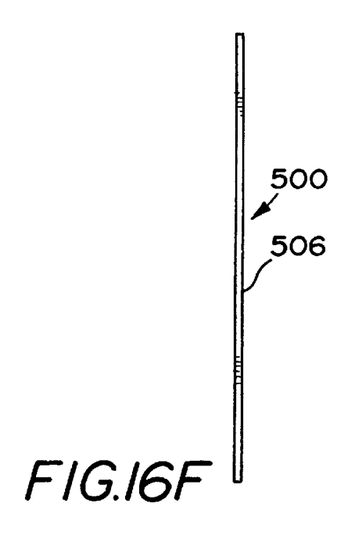
FIG. 16F a side view.

FIGS. 15A–15D illustrate a variety of ways to connect an end of a protector to a vehicle. FIG. 15A shows a protector 430 with a Velcro™ strip 431 for connection to such material on a vehicle. FIG. 15B shows a protector 434 with a plurality of pieces of Velcro™ material 436. FIG. 15C shows a protector 438 with a strip of magnets or magnetic tape 440. FIG. 15D shows a protector 442 with a series of holes 444 which are usable with corresponding buttons or hooks on a vehicle. "Bungee" cords may also be used with the holes 444. It is within the scope of this invention to use any suitable apparatus or system to connect a protector end to a vehicle end or side, including but not limited to, semi-permanent screws or bolts, chain, wire, zippers, snaps, or rope.

FIGS. 16A–16F show a protector 500 according to the present invention with a body 502, sides 504, 506 and ends 508, 510. A fabric pocket or channel 512 on the body 502 facilitates connection of the end 508 to a prime mover and insures that a portion 513 is held against the prime mover. Rope, wire, or cable 514 is movably disposed through the channel 512 and is connected to the prime mover as previously described. A hole 516 covered by a flap 518 accommodates a device such as part of a tow bar. Belt loops 520 may be used to receive a belt or rope for supporting the body 502. Elastic pieces of material 522 accommodate relative movement of two vehicles between which the protector 500 is used and automatically adjust the distance between the ends 508 and 510. Instead of the cable 514 a series of buttons, hooks, or snaps may be used. Any connection apparatus disclosed herein may be used to connect the protector 500 to a vehicle.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A protector for positioning in a space between two adjacent vehicles, one vehicle in front of and connected to the other, the protector comprising a protective member configured to fit into the space between the two vehicles, and movement means connected to the protective member for accommodating relative movement between the two vehicles, the protective member having at least one hole therethrough to inhibit sailing of the protective member, the protective member having a periphery and four sides and four corners, a cable movably disposed through a channel formed around at least a portion of the periphery of the protective member, the cable having exposed portions the four corners of the four corners of the protective member, a pulley connected to a first vehicle, the cable movable on the pulley, and a spring movably connected to the cable and connected to a second vehicle interconnected to the first vehicle, the cable movable with respect to the spring.

2. A protector for positioning in a space between two vehicles, the two vehicles including a first vehicle in front of a second vehicle, the protector comprising a protective member configured to fit into the space between the two vehicles, the protective member having a periphery and four sides and four corners, movement means connected to the protective member for accommodating relative movement between the two vehicles, the movement means comprising a cable movably disposed through a channel formed around at least a portion of a periphery of the protective member, the cable having exposed portions at at least two corners of the protective member, and at least one pulley connected to one of the vehicles, the cable movable on the pulley.

3. A protector for positioning in a space between two vehicles, the two vehicles including a first vehicle in front of a second vehicle, the protector comprising a protective member configured to fit into the space between the two vehicles, movement means connected to the protective member for accommodating relative movement between the two vehicles, the protective member having a periphery and four sides and four corners, at least one spring connected to one of the four corners of the protective member, and at least one spring connected to one of the vehicles.

4. A protector for positioning in a space between two vehicles, the two vehicles including a first vehicle in front of a second vehicle, the protector comprising a protective member configured to fit into the space between the two vehicles, movement means connected to the protective member for accommodating relative movement between the two vehicles, the protective member having a periphery and four sides and four corners, a cable movably disposed through a channel formed around the periphery of the protective member, the cable having exposed portions at each of the four corners of the protective member, two pulleys spaced apart and connected to a first vehicle, the cable movable on the pulleys, and two springs spaced apart and movably connected to the cable and connected to a second vehicle interconnected to the first vehicle, the cable movable with respect to the springs.

5. The protector of claim 3 wherein the at least one spring includes a first spring and a second spring, the first spring connected to a first end of the protective member and to a first vehicle of the two adjacent vehicles and the second spring connected to a second end of the protective member spaced apart from and opposite the first end of the protective member, and the second spring connected to an end of the second vehicle spaced apart from the end of the first vehicle.

6. A protector for positioning in a space between two vehicles, the two vehicles including a first vehicle in front of a second vehicle, the protector comprising a protective member configured to fit into the space between the two vehicles, movement means connected to the protective member for accommodating relative movement between the two vehicles, and at least one elastic member on the protective member to maintain the protective member taut between the two vehicles.

7. The protector of claim 6 wherein the at least one elastic member is a plurality of elastic members spaced apart on the protective member.

8. A protector for positioning in a space between two vehicles, the two vehicles including a first vehicle in front of a second vehicle, the protector comprising a protective member configured to fit into the space between the two vehicles, movement means connected to the protective member for accommodating relative movement between the two vehicles, and a channel formed at one end of the protective member, the channel suitable for receiving an elongated member, the elongated member securable to one of the vehicles, and at least one component of the movement means releasably securable to the elongated member.

9. A protector for positioning in a space between two vehicles, the two vehicles including a first vehicle in front of a second vehicle, wherein the second vehicle has front lights, the protector comprising a protective member configured to fit into and to cover the space between the two vehicles, movement means connected to the protective member for accommodating relative movement between the two vehicles, and the protector is positionable in the space between the two vehicles to protect the front lights of the second vehicle.

10. The protector of claim 9 wherein the protective member is formed of material selected from the group consisting of screening, nylon, mesh, metal foil, cloth, canvas, fencing, fiberglass, and plastic.

11. The protector of claim 10 wherein the material is flexible.

12. The protector of claim 9 further comprising the protective member having at least one hole therethrough to inhibit sailing of the protective member.

13. The protector of claim 9 further comprising the protective member having at least one hole therethrough through which another member may protrude when the protector is emplaced between the two vehicles.

* * * * *